(12) United States Patent
Pickutoski

(10) Patent No.: US 8,031,580 B1
(45) Date of Patent: Oct. 4, 2011

(54) RECORDING MEDIA WITH FEATURES TO RENDER MEDIA UNREADABLE AND METHOD AND APPARATUS FOR REPLICATION OF SAID MEDIA

(75) Inventor: Ed Pickutoski, Blakely, PA (US)

(73) Assignee: Cinram International Inc., Scarborough (CA)

( * ) Notice: Subject to any disclaimer, the term of this patent is extended or adjusted under 35 U.S.C. 154(b) by 803 days.

(21) Appl. No.: 12/126,667

(22) Filed: May 23, 2008

Related U.S. Application Data

(60) Provisional application No. 60/931,849, filed on May 25, 2007.

(51) Int. Cl.
*G11B 7/24* (2006.01)

(52) U.S. Cl. .................. 369/275.1; 369/283; 369/288

(58) Field of Classification Search ............... 369/275.1, 369/275.3, 288, 53.21, 47.12, 47.1, 283
See application file for complete search history.

(56) References Cited

U.S. PATENT DOCUMENTS

| | | |
|---|---|---|
| 5,825,292 A | 10/1998 | Tsai et al. |
| 5,930,214 A | 7/1999 | Kasahara et al. |
| 6,482,551 B1 | 11/2002 | Dhar et al. |
| 6,678,096 B2 | 1/2004 | Sugi et al. |
| 6,695,213 B2 | 2/2004 | Curtis |
| 6,709,802 B2 | 3/2004 | Lawandy et al. |
| 6,743,552 B2 | 6/2004 | Setthachayanon et al. |
| 6,765,061 B2 | 7/2004 | Dhar et al. |
| 6,780,546 B2 | 8/2004 | Trentler et al. |
| 6,798,547 B2 | 9/2004 | Wilson et al. |
| 6,825,960 B2 | 11/2004 | Curtis et al. |
| 6,831,762 B2 | 12/2004 | Schuck et al. |
| 6,856,461 B2 | 2/2005 | Curtis |
| 6,909,529 B2 | 6/2005 | Curtis |
| 6,939,648 B2 | 9/2005 | Dhar et al. |
| 6,947,371 B2 | 9/2005 | Bigley |
| 7,092,133 B2 | 8/2006 | Anderson et al. |
| 7,145,846 B2 | 12/2006 | Ando |
| 7,164,514 B2 | 1/2007 | Raguin |
| 7,167,286 B2 | 1/2007 | Anderson et al. |
| 7,184,383 B2 | 2/2007 | Ayres et al. |
| 7,184,392 B2 | 2/2007 | Bigley |
| 7,187,645 B2 | 3/2007 | Bigley |
| 7,209,270 B2 | 4/2007 | Curtis |
| 7,227,445 B2 | 6/2007 | Atkinson |
| 7,232,637 B2 | 6/2007 | Cole et al. |
| 7,233,446 B2 | 6/2007 | Downing et al. |
| 7,295,356 B2 | 11/2007 | King |
| 7,325,287 B2 | 2/2008 | Sweeney |
| 7,336,409 B2 | 2/2008 | Sissom |
| 7,419,045 B2 | 9/2008 | Kelsch |
| 7,535,806 B2 | 5/2009 | Fumanti |
| 7,564,771 B2 | 7/2009 | Sweeney |
| 2004/0022542 A1 | 2/2004 | Atkinson |
| 2006/0023598 A1 | 2/2006 | Babinski et al. |

(Continued)

OTHER PUBLICATIONS

Pearson, Joseph. "Increasing Security in the Supply Chain with Electronic Security Markers" Aug. 2006; http://www.ti.com/rfid/docs/manuals/whtPapers/wp_eSecurity_Markers.pdf.

(Continued)

*Primary Examiner* — Ali Neyzari
(74) *Attorney, Agent, or Firm* — Cooper & Dunham LLP

(57) ABSTRACT

Optical recording media configured to deter unauthorized access are described. Methods for manufacturing the optical recording media described above are also presented.

9 Claims, 6 Drawing Sheets

U.S. PATENT DOCUMENTS

| | | |
|---|---|---|
| 2006/0104190 A1 | 5/2006 | Babinski |
| 2006/0165419 A1 | 7/2006 | Musto |
| 2006/0181706 A1 | 8/2006 | Sweeney |
| 2006/0222808 A1 | 10/2006 | Pickutoski et al. |
| 2006/0270080 A1 | 11/2006 | Rinaldi |
| 2006/0274617 A1 | 12/2006 | Musto et al. |
| 2007/0013601 A1 | 1/2007 | Atkinson et al. |
| 2007/0013602 A1 | 1/2007 | Atkinson et al. |
| 2007/0013603 A1 | 1/2007 | Atkinson et al. |
| 2007/0036063 A1* | 2/2007 | Park et al. .................. 369/275.4 |
| 2007/0090006 A1 | 4/2007 | Kelsch |
| 2007/0098947 A1 | 5/2007 | Mueller |
| 2007/0147224 A1 | 6/2007 | Bigley |
| 2007/0242589 A1 | 10/2007 | Redmond et al. |
| 2008/0100890 A1 | 5/2008 | Curtis et al. |

OTHER PUBLICATIONS

Holographic Basics: "Holographic Storage" InPhase Technology, 2007; http://www.inphase-technologies.com/downloads/pdf/technology/holoBasics.pdf.

"What is Holographic Storage?" InPhase Technology, 2007; http://www.inphase-technologies.com/downloads/pdf/technology/whatIsHoloStorage.pdf.

U.S. Appl. No. 11/705,682, filed Feb. 13, 2007 of Michael Parette.

U.S. Appl. No. 11/715,249, filed Mar. 6, 2007 of William R. Mueller et al.

U.S. Appl. No. 11/726,968, filed Mar. 22, 2007 of Lewis Gensel et al.

U.S. Appl. No. 11/936,625, filed Nov. 7, 2007 of Petrus Hubertus Van Hoof et al.

U.S. Appl. No. 11/938,572, filed Nov. 12, 2007 of Dominick A. Dallaverde et al.

* cited by examiner

Signal reproduction characteristics deteriorates beyond acceptable value when film layer 230 is attached.

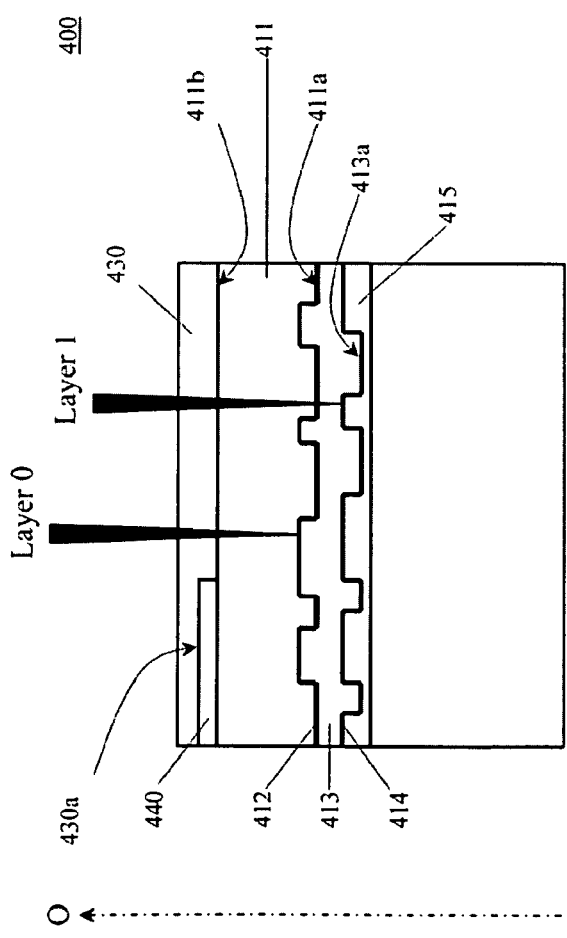

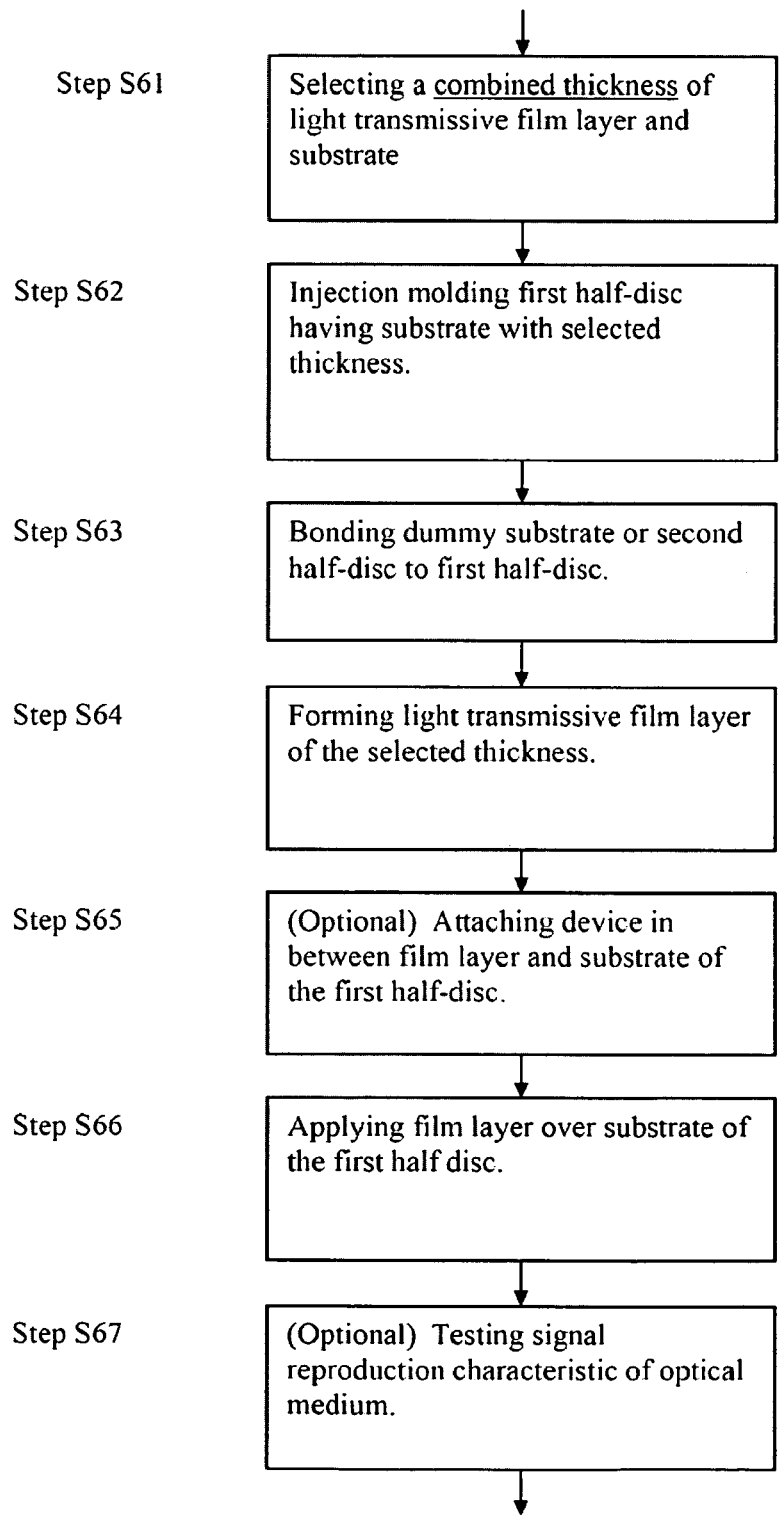

RECORDING MEDIA WITH FEATURES TO RENDER MEDIA UNREADABLE AND METHOD AND APPARATUS FOR REPLICATION OF SAID MEDIA

CROSS-REFERENCE TO RELATED APPLICATION

This application claims the benefit of U.S. provisional application Ser. No. 60/931,849, filed May 25, 2007, the entire contents of which are incorporated herein by reference.

TECHNICAL FIELD

The present disclosure relates to recording media and more particularly to features that allow control of access to content on recording media and/or deter theft thereof.

BACKGROUND

Optical recording media are popularly used for storing and distributing large volumes of content. Examples of optical recording media (optical media) commonly distributed via retail outlets include CDs (compact discs), DVDs (digital versatile disc or digital video discs), HD-DVDs, and BDs.

Several formats of optical media are currently available, including (A) read-only formats such as CD-DA (digital audio compact disc), CD-ROM (CD-read-only memory), DVD-ROM, and other formats wherein content is pre-recorded on the medium, and (B) recordable formats in the form of (i) write-once read-may times formats such as CD-R (CD-recordable), and DVD±R (DVD recordable), etc., or (ii) rewritable formats such as CD-RW (CD-rewritable), DVD-RAM (DVD-Random Access Media), DVD-RW or DVD+RW (RVD-rewritable), PD (Phase change Dual disc) and other phase change optical media. Players that reproduce content recorded on these optical media use a red laser. Optical media, such as HD-DVD and BD (each of which include read-only, recordable and rewritable formats), that can be reproduced with players using a blue laser have also been introduced.

Optical media can be used to store and distribute large volumes of content. For example, a CD-ROM typically has a capacity in excess of 600 MB. Other optical media have recording densities significantly greater than that of a CD. For example, conventional DVD read-only discs have a capacity of from 4.7 GB to 17.0 GB, and HD-DVD and BD discs can store even more content.

Unfortunately, the high capacity of optical media, coupled with recent enhancements to personal computers and the advent of recordable optical media technology, also renders optical media popular for illicit use. For example, unauthorized copying of proprietary and/or copyrighted, recorded content from optical media to optical media on a large scale (also referred to as "piracy") is a growing concern. The piracy typically entails using software on a computer system having an optical medium drive to copy content from a recorded optical medium onto recordable media such as CD-R or CD-RW (or DVD-R, DVD-RW or DVD+RW) discs.

In addition, theft of prerecorded optical media from retailers, although not widely reported to the public, has received considerable attention from content producers, replicators, retailers, and other parties along the distribution chain, since such thefts occur on a large scale. In the past, retailers have employed different techniques to deter theft of prerecorded optical discs from the retail store. These techniques included, for example, the use of bulky packaging that were difficult to conceal, and/or attaching electronic surveillance mechanisms to optical disc packaging.

While such techniques served to some extent as deterrence, they each have significant disadvantages. Bulky packaging for instance leads to substantial solid waste. Electronic surveillance mechanisms (hereinafter, electronic markers) attached to optical disc packaging were easily circumvented by removal of the optical disc from the point-of-sale.

It has been proposed that miniature electronic markers (such as RF transmitters or transponders) may be directly attached to or embedded into prerecorded optical media. For example, it has been proposed to attach an annular electronic marker including a radio frequency identification (RFID) tag to the center hub of an optical disc. As another example, it has been proposed to embed an electronic marker within a non-readable zone of the optical disc. Electronic markers that are sandwiched in between two substrates or within a substrate of an optical disc have also been proposed. However, such markers prevent theft only if passed thru sensing device. They cannot prevent theft from storeroom or truck.

Several disadvantages exist in current proposals for attaching electronic markers directly to an optical medium. First, the use of electronic markers such as RFID tags remain relatively cost prohibitive. Another disadvantage of current design is that an electronic marker attached to the surface of an optical disc is susceptible to tampering and separation from the optical disc. Further, embedding electronic markers in between two substrates or within a substrate requires substantial and costly changes to current optical disc manufacturing equipment.

Therefore, a need remains for an improved approach for controlling access to prerecorded content on an optical recording medium, that preferably allows such prerecorded optical recording media to be replicated with only minimal changes to current manufacturing equipment, thus allowing existing manufacturing lines to remain substantially intact with only minor adjustments thereto.

SUMMARY

The present disclosure describes various embodiments and examples of features that enable control of access to prerecorded content on an optical recording medium.

In addition, the present disclosure provides techniques for replicating such optical recording medium which require only minimal changes to current manufacturing equipment.

For example, in one aspect of the present disclosure, there is provided an optical recording medium including a light transmissive film layer in an optical path of a light beam to a targeted information layer of the optical medium.

In one exemplary embodiment, partial or complete removal of the film layer changes the optical focus path of the light beam, originally optimized to reduce spherical aberration, thereby defocusing the light beam and inhibiting reproduction from the information layer.

In another exemplary embodiment, the film layer has a selected thickness which when coupled with the other layers in the optical path render an information layer in the optical path unreadable, and on the other hand when the film layer is removed from the optical path, the light beam can focus on the targeted information layer of the optical medium.

BRIEF DESCRIPTION OF DRAWINGS

The features of the subject matter of this disclosure can more readily be understood from the following detailed description with reference to the accompanying drawings wherein:

FIGS. 4A and 4B illustrate an optical recording medium, according to another exemplary embodiment of this disclosure;

FIG. 6 is a flow chart for a method for optical recording medium replication, in accordance with a second exemplary embodiment of the present application.

DETAILED DESCRIPTION

The following discussion of exemplary embodiments is set forth to aid in an understanding of the subject matter of this disclosure, but is not intended, and should not be construed, to limit in any way the scope of this disclosure. Therefore, while specific terminology is employed for the sake of clarity in describing some exemplary embodiments, the present disclosure is not intended to be limited to the specific terminology so selected, and it is to be understood that each specific element includes all technical equivalents thereof.

This disclosure describes a tamper-resistant optical recording medium that incorporates features to control access to recorded content. This disclosure further describes techniques to replicate such optical recording media which require only minimal changes to current manufacturing equipment.

Figure 1:
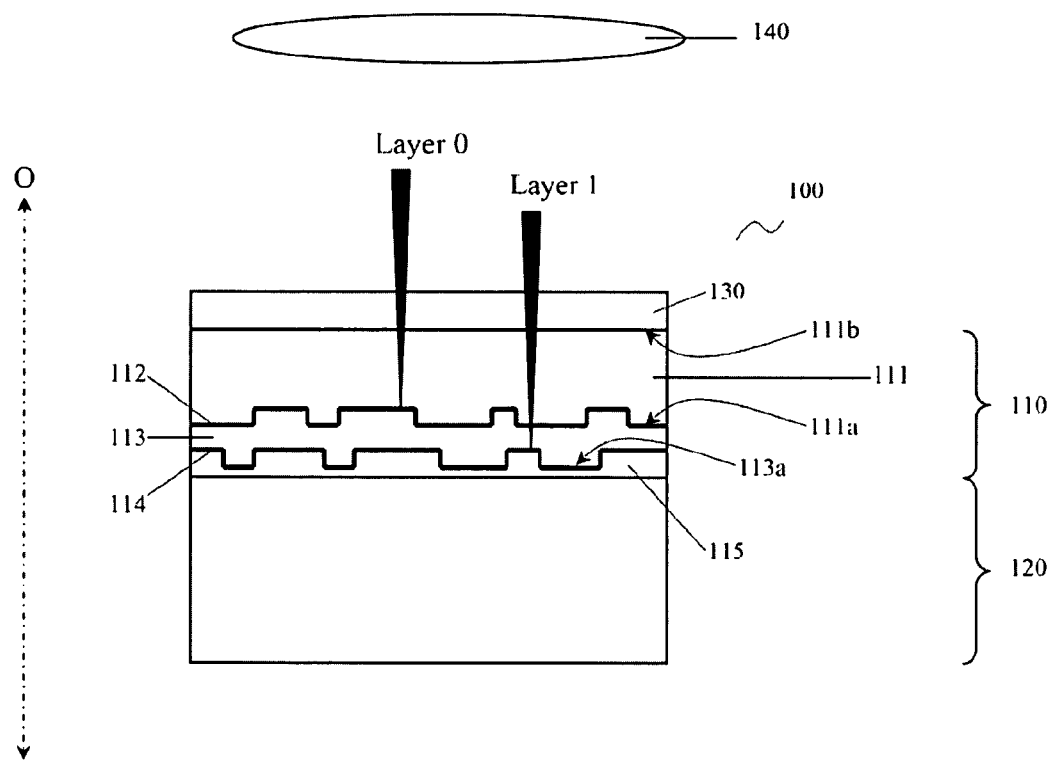
FIG. 1 is a sectional view of an optical recording medium, according to an exemplary embodiment of the present disclosure.

FIG. 1 depicts an example of the basic structure of an optical recording medium (or optical recording disc) incorporating the subject matter of the present disclosure.

In FIG. 1, a single-sided dual-layer optical recording medium 100 incorporating the subject matter of the present disclosure is provided. The term "single-sided" refers to an optical medium having a single substantially planar surface from which recorded optical signal can be reproduced. The term "dual-layer" refers to an optical medium having two information layers from which recorded optical signals can be reproduced.

The term "substrate" refers to a substantially light transmissive plastic medium [for example, acrylic (such as spin-coated materials) polycarbonate or polymethyl methacrylate (PMMA)] that can further include one or more planes ("land") on which information is recorded as a pattern of microscopic "pits". The microscopic pits are arranged in information tracks, conventionally spaced radially from the center hub in a spiral track originating at the medium center hub and ending toward the medium's outer rim.

The optical recoding medium 100 is comprised of two half-discs 110 and 120. The term "half-disc" is used generally in this disclosure to include any discs or planar object including a substrate and having a thickness of 0.3 mm to 0.8 mm. Half disc 110 includes a semi-reflective (metallic) layer 112 provided on a first plane 111a of a substrate 111. The semi-reflective layer 112 is followed by a space layer 113 that is substantially light transmissive, a fully-reflective (metallic) layer 114, and a plastic layer 115. In the case of pre-recorded optical recording discs, information-bearing structures in the form of pits can be embossed on substrate first plane 111a and space layer plane 113a.

Substrate first plane 111a and semi-reflective layer 112 form a first information layer (layer 0) that is closer to the objective lens 140 of an optical disc player than a second information layer (layer 1) that includes space layer plane 113a and fully-reflective layer 114.

A second half-disc 120 can be bonded back to back to first half-disc 110. Typical dual layer construction includes information on each disc (110 and 120), bonded by "space layer" adhesive. However, half-disc 120 can be a transparent dummy substrate on which no content is recorded.

A light transmissive film layer 130 can be designed to attach to a second plane 111b of substrate 111. Film layer 130 may be backed with an adhesive that adheres at room temperature to substrate 111. [Possible means for removing the film layer at the point of sale?] The adhesive adhering film layer 130 to substrate 111 may further be designed to have decreased adhering characteristics when exposed to a brief but relatively higher temperature, allowing for the separation of film layer 130 from substrate 111.

With respect to the optical medium 100 described above, an optical axis OA is further defined as an imaginary line perpendicular to the planar surfaces of the light transmissive substrate 111 and film layer 130.

The two half-discs 110 and 120 need not be of the same thickness (in the direction of the OA). However, the two half-discs 110 and 120 plus the film layer 130 together form an optical storage medium 110 having a thickness in a range of 1.0 mm to 1.5 mm The thickness of the light transmissive substrate 111 and film layer 130 (which are positioned between a first information layer and the objective lens) are of particular importance and are described below in further detail.

A conventional optical media player having a pick up head with a light source is used to reproduce content stored on the optical media. The light beams emitted from the light source are transmitted through a collimator causing the light beams to align in parallel. The light beams then pass through a numerical aperture (NA) adjusting system to adjust the NA in accordance to the wavelength ($\lambda$) of light used, and then through an objective lens system which converges/focuses light beams onto a condensing point in a selected information layer.

The light beams reflected from a target information layer vary according to the presence or absence of pits along the information track. A photodetector and other electronics inside the optical media player translate the signal from the transition points between these pits and land caused by this variation into the 0s and 1s of the digital code representing the recorded content.

To reproduce recorded signal from an optical media of higher density (and shorter pit length), a condensing point with a sufficiently small spot diameter D (or spot definition) is required. The spot diameter D of a condensing point is a function of the NA and the wavelength $\lambda$ of light used, such that D is proportional to the wavelength $\lambda$ and inversely proportional to NA.

Therefore, to achieve a smaller spot diameter D, either a light beam of relatively smaller wavelength $\lambda$ or an objective lens system of larger NA, or both is needed. For example, to reproduce signals from CDs, an objective lens with NA of 0.47 and light wavelength $\lambda$ of 780 nm is used. Signals from DVDs which have a higher recording density (and shorter pit length) than CDs are reproduced with an objective lens with NA of 0.6 and light wavelength $\lambda$ of 650 nm.

The objective lens system focuses light beams along an optical path that includes the thickness of one or more light transmissive layers on to a selected information layer, with each information layer corresponding to an optical path length.

In conventional optical recording medium design, a relatively tight tolerance of the thickness (along the optical axis) of the light transmissive layers between the first information layer and the objective lens system is required. The objective lens system is further designed to provide minimized spherical aberration through light transmissive layers having thickness within the range of acceptable thicknesses. Light transmissive layers manufactured with thicknesses outside of this acceptable range result in loss of spot definition, resulting in unacceptable loss in reflected beam intensity, so that reproduction of content from the information layer is rendered impossible.

It is also well understood in the art that the degree of spherical aberration with respect to the thickness changes increases proportionally to the fourth power of the NA of the objective lens. Therefore, when using a higher NA, a change in thickness leads to a degree of spherical aberration that may exceed allowable limits for signal reproduction.]]

The subject matter of the present disclosure manipulates optical path length of light beams through light transmissive layers to control access to content stored on information layers.

Figure 2A:
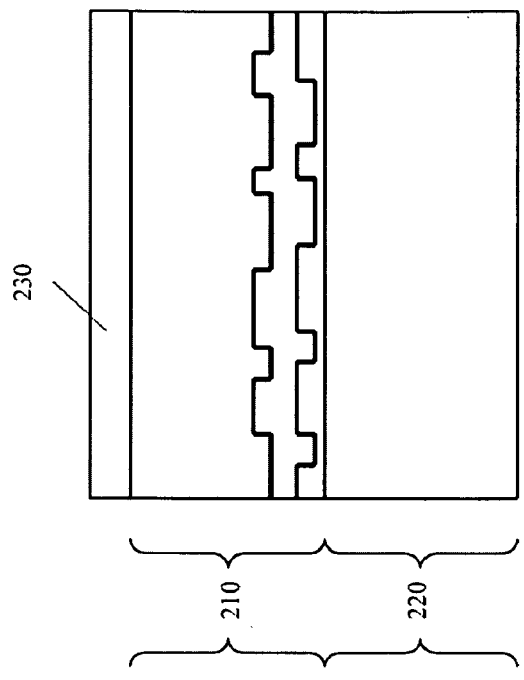
FIGS. 2A and 2B illustrate an optical recording medium, according to another exemplary embodiment of this disclosure.

An optical recording medium according to an exemplary embodiment of this disclosure will be discussed below with reference to FIGS. 2A and 2B. Optical recording medium 200 includes substrate 211 configured to have a thickness along the optical axis OA such that spherical aberration of an incident light beam (having an optical path that includes the thickness of light transmissive substrate 211) is within an acceptable range to yield a condensing point of sufficiently small diameter D to allow signal reproduction.

Figure 2B:
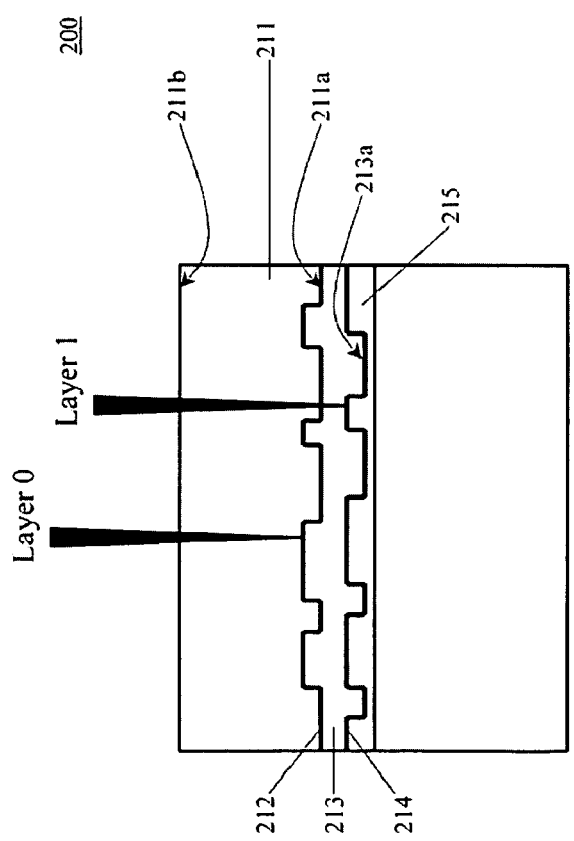

Referring to FIG. 2B, film layer 230 is adapted to have a thickness along the optical axis OA such that when film layer 230 is bonded to substrate 211 a light beam incident upon film layer 230 (and having an optical path that now includes the thickness of both film layer 230 and substrate 211) is subjected to spherical aberration of a degree where signal reproduction characteristics deteriorates beyond an acceptable value.

Upon removal of film layer 230, acceptable signal reproduction characteristics can again be restored. In other words, removal of film layer 230 restores an intended optical focus path for the impinging light beam thus permitting signal reproduction.

Figure 3B:
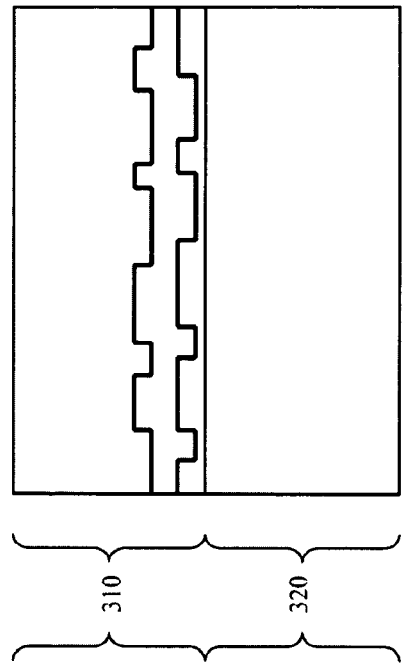
FIGS. 3A and 3B illustrate an optical recording medium, according to another exemplary embodiment of this disclosure.
Figure 3A:
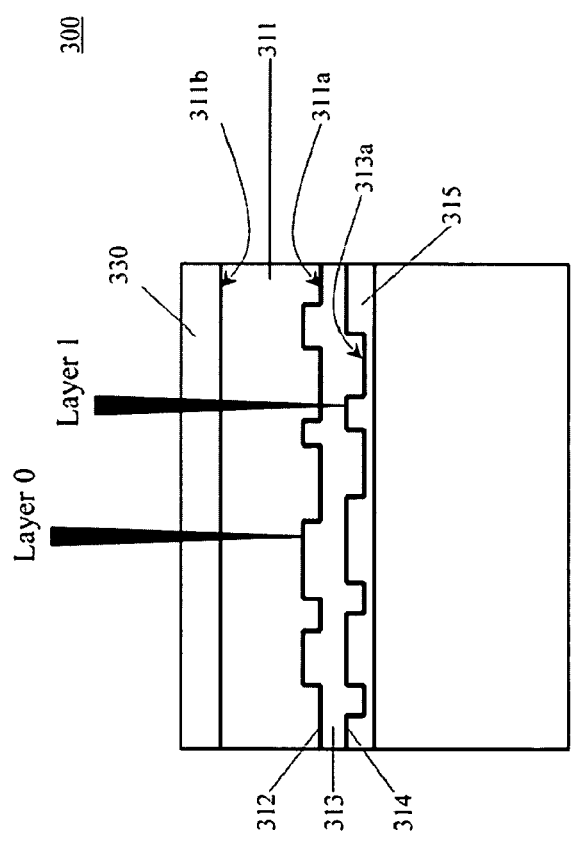

In a second exemplary embodiment of the present disclosure, as shown in FIG. 3 (which is not drawn to scale), a substrate 311 and film layer 330 has a combined thickness in the direction of the optical axis OA such that a light beam is subjected an acceptable degree of spherical aberration and can still be focused on to a targeted information layer allowing signal reproduction. Upon removal of the film layer 330, the optical paths of light beams through the transmissive layers are altered and light beams incident on substrate 311 will experience an unacceptable level of spherical aberration such that light beans cannot focus on any information layer. Access to content stored in the information layers 0 and 1 is thereby denied.

In a third exemplary embodiment, as shown in FIG. 4 (which is not drawn to scale), and similar to the second exemplary embodiment described above, a device 440 can be positioned in between substrate face 411b and film layer 430. Film layer 430 can be further designed to accommodate device 440. As an example, film layer 430 can be designed to have an annular cavity 430a having substantially the same dimensions and thickness as device 440 such that device 440 is received into the cavity 430a when positioned in between substrate 411 and film layer 430. An attempt to remove device 440 requires the complete or partial removal of film layer 430. As described by the second exemplary embodiment provided above, complete or partial removal of the film layer 430 results in a change in the optical path of an incident light beam. An unacceptable level of aberration of the incident light beam is introduced and the light beam can then no longer be condensed/focused on either of information layer 0 or information layer 1. Access to the content stored in information layer 0 and 1 is thereby denied. Device 440 may for example, be a radio frequency identification (RFID) tag. The RFID tag offers such benefits as unique identification of a particular optical medium and improved inventory control at the point-of-sale. Alternatively, device 440 may be a layer of material with optical properties that can be switched between two or more light transmissive states upon application of a signal. Such a switching feature may, for example, provide further control over access to contents stored on the optical media.

The first three embodiments disclosed above may further include other variations. For example, an adhesive layer (not shown) can be applied to attach the light transmitting film layer to the substrate. The adhesive layer may further form a portion of the optical focus path of the light beam such that if the adhesive layer is partially or fully removed, the optical focus path of the light beam is modified, leading to a further deterioration in optical signal reproduction characteristic of the optical medium. In another example, an optical medium is double-sided (i.e., having one or more information layers on each of its two sides) and has a film layer as described in the three embodiments discussed above, on each side to control access to content recorded on each side. In yet another variation, the information layer is formed near the near the read surface of an optical recording medium. The light transmissive film layer then acts as a protective cover layer over the information layer. Complete or partial removal of the film layer also results in a change in the optical focus path of the light beam. An unacceptable level of aberration of the incident light beam is introduced and the light beam cannot be condensed on either of information layer 0 and 1 to result in signal reproduction. Access to the content stored in information layer 0 and 1 is thereby controlled.

A process for producing a read-only type optical medium using a conventional injection molding process will be described below. Data representing the content to be recorded, encoded as a run length limited digital code which contains its digital information in the timing between transitions, is used in a mastering process to control a laser beam recorder to form pits in a photoresist or a dye-polymer layer on an optical grade glass disc known as a glass master (or equivalent such as ptm using Silicon wafer). A metallized glass master is used in an electroforming process to form (typically, metal) stampers. A stamper is used on one side of an injection molding cavity to emboss a layer of pits and lands on a light transmissive polymer substrate formed by injection molding. The depth of the injection molding cavity can be adjusted in order to change the thickness of the molded substrate. The information bearing surface of the substrate is then covered with a reflective film (of metal or alloy) or the like, to form an information layer. In the case of a CD, a plastic protective coating is applied over the reflective film, and then art (for example, a picture, design, text, etc.) is typically printed on the upper surface of the disc (that is, on the side of the substrate which bears the information layer), to form an end product which is approximately 1.2 mm thick. In the case of DVDs, two half discs (that is, approximately 0.6 mm each) are typically formed, metallization is applied to one (for example, DVD-5) or both (for example, DVD-9, DVD-10 or DVD-18) half discs, and the two half-discs are bonded by an adhesive (for example, hotmelt adhesive, ultraviolet light-cured adhesive, etc.), with the information layer/s being shielded from the external environment by the light transmissive substrates.

A second information layer can be formed in each half-disc (for example, DVD-18) by applying a photo-polymer coating over a metallization layer applied to a half-thickness substrate (prior to bonding) and the second information layer is embossed by a stamper (or stamper disc) into the photo-polymer layer which is then UV cured, metallized and protective coated. Thus, the information layers in such conventional DVD discs are typically in the middle of the disc, sandwiched between substrates.

The above explains a 2P process which can be used to emboss additional layers in, for example, BD discs.

On the other hand, a surface transfer process (STP) can be used for DVD 14/18 discs (for example). That is, molding and sputtering layer 1 using PMMA, and then bonding to sputtered Layer 0 made of polycarbonate. The PMMA is then removed (STP) leaving a sputtered Layer 1 bonded to the Layer 0 half disc. Such processes are described in, for example, U.S. Pat. Nos. 6,117,284 (Mueller) and 6,309,496 (Van Hoof), the entire contents of which are incorporated herein by reference.

Some exemplary optical recording media manufacturing techniques (including methods, systems and apparatuses) are discussed in U.S. Pat. Nos. 5,181,081, 5,315,107, 5,766,495, 5,792,538, 5,900,098, 5,932,042, 5,932,051, 5,932,058, 5,935,673, 5,949,752, 5,958,651, 5,995,481, 5,997,976, 6,117,284, 6,124,011, 6,160,787, 6,309,496, 6,309,727, 6,361,845, 6,440,248, 6,527,538, 6,726,973 and 6,896,829, which are incorporated by reference herein in their entireties in order to more fully describe the state of the art as of the date of the subject matter described and claimed herein. Additional exemplary techniques are discussed in U.S. Pat. Nos. 4,995,799, 5,766,359, 5,800,687, 5,863,328, 5,863,399, 5,913,653, 6,261,403, 6,368,435 and 6,814,825, which are also incorporated by reference herein in their entireties.

HD DVD format discs can be replicated using a process similar to the process for forming a DVD disc, except that the minimum pit length is shorter and therefore the laser beam recorder used in the mastering process must be adapted to form the shorter pits. The information surface of an HD DVD format disc is nominally 0.6 mm below the surface of the disc, similar to DVD discs.

BD format discs are typically manufactured by injection molding a 1.1 mm substrate with pits and sputtering a reflective film over the pits to form an information layer, and applying a 0.10 mm light transmissive cover layer over the information layer.

Figure 5:
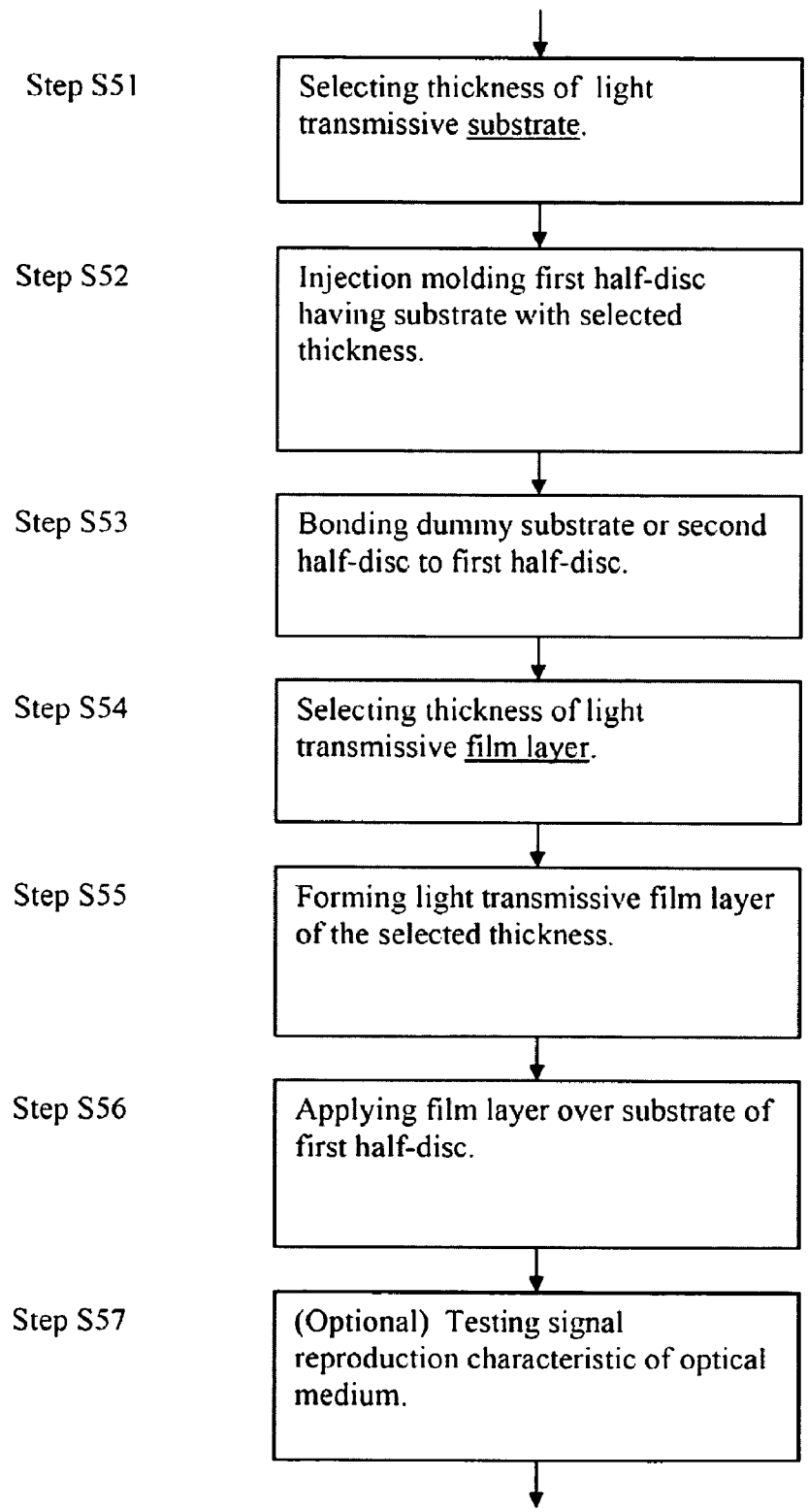
FIG. 5 is a flow chart for a method for optical recording medium replication, in accordance with an exemplary embodiment of the present application.

An optical recording medium replication method according to an exemplary embodiment of this disclosure will be discussed below with reference to FIG. 5.

This first exemplary method includes selecting the thickness (in the direction of optical axis OA) of a light transmissive substrate such that spherical aberration of incident light beams are within an acceptable range where light beams can be focused on a target information layer, resulting in signal reproduction (step S51), injection molding a first half-disc having a light transmissive substrate of the selected thickness (step S52), bonding a dummy substrate or a second half-disc (with one or multiple information layers) to the non-read side of the first half-disc (step S53), selecting the thickness (in the direction of optical axis OA) of a light transmissive film layer such that when film layer is bonded to substrate, a light beam incident upon the film layer is subjected to spherical aberration of a degree where light beams can no longer be focused on any information layer, resulting in signal reproduction characteristics deterioration beyond an acceptable value (step S54), forming a light transmissive film layer of the selected thickness (step S55), and applying the film layer over a light incident second side of the substrate of the first half-disc (step S56). The film layer can be rolled on to the substrate at one edge of the recording medium. A roller can then be passed over the film layer to ensure that it adheres uniformly to the substrate. Optionally, signal reproduction characteristics of the optical medium (with and without the film layer) can then be tested (step S57).

Next, a second exemplary method for optical recording medium replication in accordance with the present application will be discussed with reference to FIG. 6.

This second exemplary method includes selecting the thicknesses (in the direction of the optical axis OA) of a light transmissive film layer and a light transmissive substrate having a combined thickness that is within a range such that upon removal of the film layer, the optical paths of light beams are altered and light beams incident on the substrate will experience an unacceptable level of spherical aberration such that light beams cannot focus on any information layer (step S61), injection molding a first half-disc having a first light transmissive substrate of the selected thickness and one or more information layers (step S62), bonding a dummy substrate or second half-disc (with one or multiple information layers) to the non-read side of the first half-disc (step S63), forming a light transmissive film layer of the selected thickness (step S64), optionally attaching a device in between the film layer and the substrate of the first half-disc (step S65), and applying the film layer over a light incident second side of the substrate of the first half-disc (step S66). Optionally, the optical medium (with and without the film layer) can be tested for its signal reproduction characteristics (step S67).

The above specific examples and embodiments are illustrative, and many variations can be introduced on these embodiments without departing from the spirit of the disclosure or from the scope of the appended claims.

The term "optical recording medium" and "optical recording media" are used in a broad sense to cover any recording medium including a recording layer wherein information recorded therein can be reproduced by applying an optical beam and detecting a beam reflected or passed through the recording layer.

For example, the subject matter of this matter can be implemented in a holographic medium. Examples of such holographic storage or recording medium are disclosed in U.S. Patent Application Publication No. US2007/0242589A1 and US2008/0100890A1, the entire contents of which are incorporated herein by reference.

A holographic storage or recording medium may entail a recording layer sandwiched between two substrates (for example, plastic), with an outer surface of each substrate being sputtered with an anti-reflective material. A device (for example, transponder or transmitter) may be installed in one of the substrates and covered by a cover or film layer sheet (and the cover layer sheet sputtered with anti-reflective material. When such cover layer sheet is removed from the medium, such as to gain access to the device, the anti-reflective coating would also be removed, rendering the emdium unusable.

It should be understood that elements and/or features of different examples and illustrative embodiments may be combined with each other and/or substituted for each other within the scope of this disclosure and appended claims.

What is claimed is:

1. An optical recording medium having at least a first read surface, comprising:
   a substrate;
   an information layer on said substrate; and
   a first film layer including a first surface and a second surface, said first film layer being positioned between said first read surface and said substrate,
   wherein said first film layer is configured with a film thickness and a light transmissive property such that one of the following occurs: (a) said film layer is removed to allow a light beam incident on said first read surface to focus on said information layer; and (b) removal of said film layer inhibits a light beam incident on said first read surface from being focused on said information layer.

2. The optical recording medium of claim 1, wherein said optical recording medium further includes a device between said first film layer and a first substrate.

3. The optical recording medium of claim 2, wherein said device is a radio frequency identification device.

4. The optical recording medium of claim 1, wherein said device is a material with optical properties that changes between two or more states upon application of light energy of a wavelength in a predetermined range.

5. The optical recording medium of claim 1 further comprising an adhesive layer bonding said first film layer to said optical recording medium, wherein said adhesive layer has a layer thickness within a predetermined range, and said removal of said first film layer inhibits said light beam incident on said first read surface from focusing on said one or more information layers.

6. A method of manufacturing an optical recording medium, comprising:
   forming a substrate having a predetermined thickness and an information layer;
   forming a film layer on a light incident surface of said optical recording medium,
   said film layer having a selected film thickness and a light transmissive property such that one of the following occurs: (a) said film layer is removed to allow a light beam incident on said first read surface to focus on said information layer; and (b) removal of said film layer inhibits a light beam incident on said first read surface from being focused on said information layer.

7. The method of claim 6 further comprising attaching a device to said substrate prior to applying said film layer to said optical recording medium.

8. The method of claim 6 further comprising attaching a device to said film layer prior to applying said film layer to said optical recording medium.

9. The method of claim 6, further comprising configuring said film layer to receive a device.

* * * * *